United States Patent
Hong et al.

(10) Patent No.: US 10,700,855 B2
(45) Date of Patent: Jun. 30, 2020

(54) REINFORCEMENT LEARNING-BASED ENCRYPTION AND DECRYPTION METHOD AND CLIENT AND SERVER SYSTEM PERFORMING THE SAME

(71) Applicant: University-Industry Cooperation Group of Kyung-Hee University, Yongin-si, Gyeonggi-do (KR)

(72) Inventors: Choong Seon Hong, Yongin-si (KR); Young Ki Kim, Suwon-si (KR)

(73) Assignee: University-Industry Cooperation Group of Kyung-Hee University, Yongin-si (KR)

(*) Notice: Subject to any disclaimer, the term of this patent is extended or adjusted under 35 U.S.C. 154(b) by 281 days.

(21) Appl. No.: 15/880,074

(22) Filed: Jan. 25, 2018

(65) Prior Publication Data
US 2019/0190700 A1    Jun. 20, 2019

(30) Foreign Application Priority Data
Dec. 18, 2017    (KR) .................. 10-2017-0173815

(51) Int. Cl.
  *H04L 9/08*    (2006.01)
  *G06F 17/11*    (2006.01)
  *H04L 29/06*    (2006.01)
  *G06N 20/00*    (2019.01)
(52) U.S. Cl.
  CPC ............. *H04L 9/085* (2013.01); *G06F 17/11* (2013.01); *G06N 20/00* (2019.01); *H04L 67/42* (2013.01)
(58) Field of Classification Search
  CPC .................................................. H04L 9/085
  See application file for complete search history.

(56) References Cited

U.S. PATENT DOCUMENTS

| 7,636,171 B1* | 12/2009 | Sigel | G11B 7/0065 356/237.1 |
| 2012/0243687 A1* | 9/2012 | Li | H04L 9/085 380/277 |
| 2017/0272209 A1* | 9/2017 | Yanovsky | H04L 67/1097 |

FOREIGN PATENT DOCUMENTS

| KR | 10-2015-0027641 A | 3/2015 |
| KR | 10-1603940 B1 | 3/2016 |
| WO | 2017/124099 A1 | 7/2017 |

OTHER PUBLICATIONS

Roxana Geambasu et al.; "Vanish; Increasing Data Privacy with Self-Destructing Data"; 18th USENIX Security Symposium; 2009; pp. 299-350.

* cited by examiner

*Primary Examiner* — William S Powers
(74) *Attorney, Agent, or Firm* — Studebaker & Brackett PC

(57) ABSTRACT

A client and server system that performs a reinforcement learning-based encryption and decryption method according to an aspect of the present invention may include: a key management module configured to manage an encryption key required in performing an encryption and a decryption of data; a secret sharing module configured to perform a secret sharing of a threshold value for a lifetime and availability of the data; and a threshold estimation module configured to perform an estimation of the threshold value; and can improve the availability and security of data to satisfy user demands in a self-destructing environment for privacy protection.

14 Claims, 6 Drawing Sheets

FIG. 5

| Algorithm : Reinforcement Learning Based Threshold Estimation |
|---|

1: Initialize $Q(s, a)$
2:    Repeat (for each episode)
3:    Initialize $s$
4:    Choose $a$ from $s$ using Q ($\varepsilon$-greedy)
5:    Repeat (for each step of episode)
6:        Take action $a$, observe $r$, $s'$
7:        Choose $a'$ from $s'$ using Q ($\varepsilon$-greedy)
8:        $Q(s, a) \leftarrow Q(s, a) + \alpha[r + \gamma Q(s', a') - Q(s, a)]$
9:        $s \leftarrow s'; a \leftarrow a'$
10:    Until $s$ is terminal

REINFORCEMENT LEARNING-BASED ENCRYPTION AND DECRYPTION METHOD AND CLIENT AND SERVER SYSTEM PERFORMING THE SAME

CROSS-REFERENCE TO RELATED APPLICATIONS

This application claims the benefit of Korean Patent Application No. 10-2017-0173815, filed with the Korean Intellectual Property Office on Dec. 18, 2017, the disclosure of which is incorporated herein by reference in its entirety.

BACKGROUND

1. Technical Field

The present invention relates to a method of encryption and decryption. More particularly, the invention relates to a reinforcement learning-based encryption and decryption method and a client and server system performing the method that can improve privacy protection.

2. Description of the Related Art

The self-destructing scheme is a system proposed in 2009 by R. Geambasu, T. Kohno, Amit A. Levy, and Henry M. Levy for protecting users' personal information stored in a storage means within a cloud computing environment and entails having the data destroyed automatically when a particular duration of time passes after the data is inputted by the user.

This system can be applied extensively in the modern information society for files, private blog posts, documents, emails, messages, and the like. While it is possible with all forms of digital contents to ensure privacy simply by deleting data, the proposed scheme provides the advantage that it does not require user intervention or additional hardware.

However, when using a self-destructing scheme to protect users' personal information stored in a storage means within a cloud computing environment, there is the problem that data may be deleted before the time desired by the user.

SUMMARY OF THE INVENTION

An objective of the present invention is to provide an encryption and decryption method based on the self-destructing scheme for protecting privacy.

Another objective of the present invention is to configure a threshold value in consideration of the availability and security of the data by applying reinforcement learning, when dividing the key used for the encryption and decryption.

A client and server system that performs a reinforcement learning-based encryption and decryption method according to one aspect of the present invention, devised as a solution to the problem described above, may include: a key management module configured to manage an encryption key required in performing an encryption and a decryption of data; a secret sharing module configured to perform a secret sharing of a threshold value for a lifetime and availability of the data; and a threshold estimation module configured to perform an estimation of the threshold value; and can improve the availability and security of data to satisfy user demands in a self-destructing environment for privacy protection.

One embodiment can further include a UI module configured to receive input from a user; and a cryptography module configured to perform the encryption and decryption of the data.

In one embodiment, the threshold estimation module can estimate the threshold value by using parameters including a state, an action, and a reward such that the reward is maximized.

In one embodiment, the threshold estimation module can select the threshold value and the total number of key pieces required for obtaining the encryption key, estimate the threshold value such that the reward is maximized based on the selected total number of key pieces and threshold value, and estimate the threshold value such that, with respect to a graph plotting the lifetime and availability of the data, a graph is obtained most closely resembling an ideal graph in relation to maximizing the reward.

In one embodiment, the threshold estimation module can structuralize an initial state and action into a matrix form, update the matrix based on a current state and action and a next state and action, and estimate the threshold value based on a most recent state, action, and reward if it is decided that the reward has been maximized.

In one embodiment, the threshold estimation value can establish a matrix $Q(s,a)$ according to the initial state and action, select a first action (a) from a first state (s) by using the matrix $Q(s,a)$, and at each step of an episode, select the first action (a), observe a first reward (r) and a second state (s'), and select a second action (a') from the second state (s').

In one embodiment, the first state (s) and first action (a) and the second state (s') and second action (a') can be determined from:

$$Q(s,a) \leftarrow Q(s,a) + \alpha[r + \gamma Q(s',a') - Q(s,a)].$$

Here, an updating of the matrix can iterated with the second state (s') and the second action (a') substituted by the first state (s) and the first action (a) until a reward corresponding to the substituted first state (s) satisfies a particular condition.

A reinforcement learning-based encryption and decryption method according to another aspect of the present invention may include: a key management process for managing an encryption key required in performing an encryption and a decryption of data; a secret sharing process for performing a secret sharing of a threshold value for a lifetime and availability of the data; and a threshold estimation process for performing an estimation of the threshold value.

One embodiment can further include a user interaction (UI) process for receiving input from a user; and an encryption process for performing the encryption and decryption of the data.

In one embodiment, the threshold estimation process can include estimating the threshold value by using parameters including a state, an action, and a reward such that the reward is maximized.

In one embodiment, the threshold estimation process can include selecting the threshold value and a total number of key pieces required for obtaining the encryption key, estimating the threshold value such that the reward is maximized based on the selected total number of key pieces and threshold value, and estimating the threshold value such that, with respect to a graph plotting the lifetime and availability of the data, a graph is obtained most closely resembling an ideal graph in relation to maximizing the reward.

In one embodiment, the threshold estimation process can include: structuralizing an initial state and action into a matrix form; updating the matrix based on a current state and action and a next state and action; and estimating the threshold value based on a most recent state, action, and reward, if it is decided that the reward has been maximized.

In one embodiment, the structuralizing of the initial state and action into a matrix form can include establishing a matrix Q(s,a) according to the initial state and action, while the updating of the matrix can include selecting a first action (a) from a first state (s) by using the matrix Q(s,a) and selecting the first action (a), observing a first reward (r) and a second state (s'), and selecting a second action (a') from the second state (s') at each step of an episode.

In one embodiment, the updating of the matrix can include determining the first state (s) and first action (a) and the second state (s') and second action (a') from:

$$Q(s,a) \leftarrow Q(s,a) + \alpha[r + \gamma Q(s',a') - Q(s,a)].$$

Here, the updating of the matrix is iterated with the second state (s') and the second action (a') substituted by the first state (s) and the first action (a) until a reward corresponding to the substituted first state (s) satisfies a particular condition.

A server for performing a reinforcement learning-based encryption and decryption method according to yet another aspect of the present invention may include: a user interaction (UI) module configured to receive input from a transmitting client terminal; a cryptography module configured to perform encryption and decryption of data; a security module configured to manage an encryption key required in performing the encryption and decryption of the data, perform a secret sharing of a threshold value for a lifetime and availability of the data, and perform an estimation of the threshold value; and a DHT network module configured to share the data with at least one receiving client terminal based on a distributed hash table (DHT).

In one embodiment, the security module can estimate the threshold value by using parameters including a state, an action, and a reward such that the reward is maximized.

In one embodiment, the security module can select the threshold value and a total number of key pieces required for obtaining the encryption key, estimate the threshold value such that the reward is maximized based on the selected total number of key pieces and threshold value, and estimate the threshold value such that, with respect to a graph plotting the lifetime and availability of the data, a graph is obtained most closely resembling an ideal graph in relation to maximizing the reward.

In one embodiment, the security module can structuralize an initial state and action into a matrix form, update the matrix based on a current state and action and a next state and action, and estimate the threshold value based on a most recent state, action, and reward if it is decided that the reward has been maximized.

In one embodiment, the security module can establish a matrix Q(s,a) according to the initial state and action, select a first action (a) from a first state (s) by using the matrix Q(s,a), and at each step of an episode, select the first action (a), observe a first reward (r) and a second state (s'), and select a second action (a') from the second state (s').

In one embodiment, the first state (s) and first action (a) and the second state (s') and second action (a') can be determined from:

$$Q(s,a) \leftarrow Q(s,a) + \alpha[r + \gamma Q(s',a') - Q(s,a)].$$

Here, an updating of the matrix can be iterated with the second state (s') and the second action (a') substituted by the first state (s) and the first action (a) until a reward corresponding to the substituted first state (s) satisfies a particular condition.

A reinforcement learning-based encryption and decryption method according to an embodiment of the invention can provide the advantages of improved availability and security of data, to satisfy the demands of the user in a self-destructing environment for privacy protection.

Also, a reinforcement learning-based encryption and decryption method according to an embodiment of the invention can improve the availability and security of the data in a discriminating manner according to the application as well as user demands.

BRIEF DESCRIPTION OF THE DRAWINGS

FIG. 5 illustrates a specific algorithm for a threshold estimation process to which reinforcement learning is applied according to an embodiment of the invention.

DETAILED DESCRIPTION OF THE INVENTION

Figure 1:
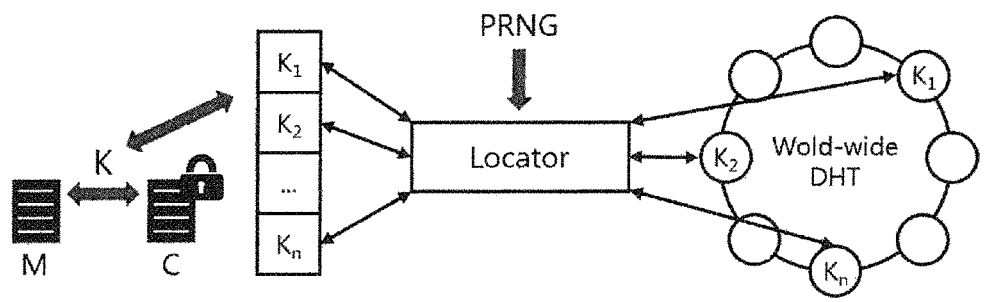
FIG. 1 illustrates the overall system structure for a self-destructing scheme according to an embodiment of the invention.

The features and effects of the present invention will be more readily apparent from the detailed descriptions below provided in conjunction with the accompanying drawings, allowing the person of ordinary skill in the field of art to which the present invention pertains to readily practice the technical spirit of the invention. As the invention allows for various changes and numerous embodiments, particular embodiments will be illustrated in the drawings and described in detail in the written text. However, this is not intended to limit the present invention to particular modes of practice, and it is to be appreciated that all changes, equivalents, and substitutes that do not depart from the spirit and technical scope of the present invention are encompassed in the present invention.

In describing the drawings, similar reference numerals are designated to similar elements.

While such terms as "first" and "second," etc., may be used to describe various components, such components must not be limited to the above terms. The above terms are used only to distinguish one component from another.

For example, a first component may be referred to as a second component without departing from the scope of rights of the present invention, and likewise a second component may be referred to as a first component. The term "and/or" encompasses both combinations of the multiple number of related items disclosed and any item from among the multiple related items disclosed.

Unless otherwise defined, all terms used herein, including technical or scientific terms, have the same meanings as those generally understood by the person having ordinary skill in the field of art to which the present invention pertains.

Such terms as those defined in a generally used dictionary are to be interpreted to have the meanings equal to the contextual meanings in the relevant field of art, and are not to be interpreted to have ideal or excessively formal meanings unless clearly defined in the present specification.

The terms "module," "block," and "part," used in the descriptions below to denote certain components, may be assigned and/or interchanged for the sake of convenience in presenting the written description, and one such term does not in itself signify a particular meaning or function.

Certain preferred embodiments of the present invention are described below with reference to the accompanying drawings to allow the person having ordinary skill in the art to readily practice the invention. In describing the embodiments of the present invention, certain detailed explanations of the related art are omitted when it is deemed that they may unnecessarily obscure the essence of the invention.

A method of performing encryption and decryption based on reinforcement learning according to an embodiment of the invention and a client and/or server system for performing the method are disclosed below.

In relation to this, FIG. 1 illustrates the overall system structure for a self-destructing scheme according to an embodiment of the invention. An essential technique in a self-destructing scheme according to an embodiment of the invention is to utilize a distributed P2P infrastructure, particularly a distributed hash table (DHT) network. The distributed hash table network is designed such that each of the nodes composing the P2P has an index-value pair. Reasons for using a distributed hash table network in the self-destructing scheme, the purpose of which is to destroy data, may include the following three unique properties.

The large number of nodes forming the network is distributed over various regions to be safe from attackers.

The design is intended for a distributed storage device, and the use of data is guaranteed for users over a desired duration of time.

The nodes forming the network are continuously added/removed, and data is automatically destroyed during the process.

By utilizing the distributed hash table network having the above properties such that data is automatically destroyed after a particular time, it is possible to prevent leaks of users' sensitive information.

Referring to FIG. 1, the system obtains a encrypted text by selecting an arbitrary encryption key to encrypt data. Then, the encryption key may be divided into many pieces by using threshold secret sharing. Here, the number of key pieces required for obtaining the encryption key may be defined as a threshold value, which may be configured by the user or by the application.

When the number of key pieces and the threshold value have been determined, another random-number-based arbitrary key may be generated. This arbitrary key may be used for specifying the locations where the key pieces are to be distributed within the distributed hash table network. If the distributed hash table network supports several types of time limits, then the relevant information may be included in the key pieces. If the number of distributed key pieces becomes smaller than the threshold value, then it would be impossible to recover the corresponding data.

A data object ultimately stored in the storage may be composed as (arbitrary key, encrypted text, total number of key pieces, threshold value), where the arbitrary key refers to the key used in designating the locations where the key pieces are to be distributed within the distributed hash table network. A data object generated utilizing the system can be transmitted over an email server or stored in an existing file system. The process of decrypting the data object may be performed in a reverse order of the encryption process and may be permitted only when the time configured by the user has not been exceeded. First, an arbitrary key may be extracted from the data object to identify the locations of the key pieces. Based on the identified locations, the key pieces may be obtained from the distributed hash table network. From the key pieces thus obtained, the key used for performing the encryption may be obtained, to decrypt the encrypted text and obtain the data. In the process described above, it can be said that the threshold value required for threshold secret sharing is an important element in satisfying the demands of the user.

Figure 2:
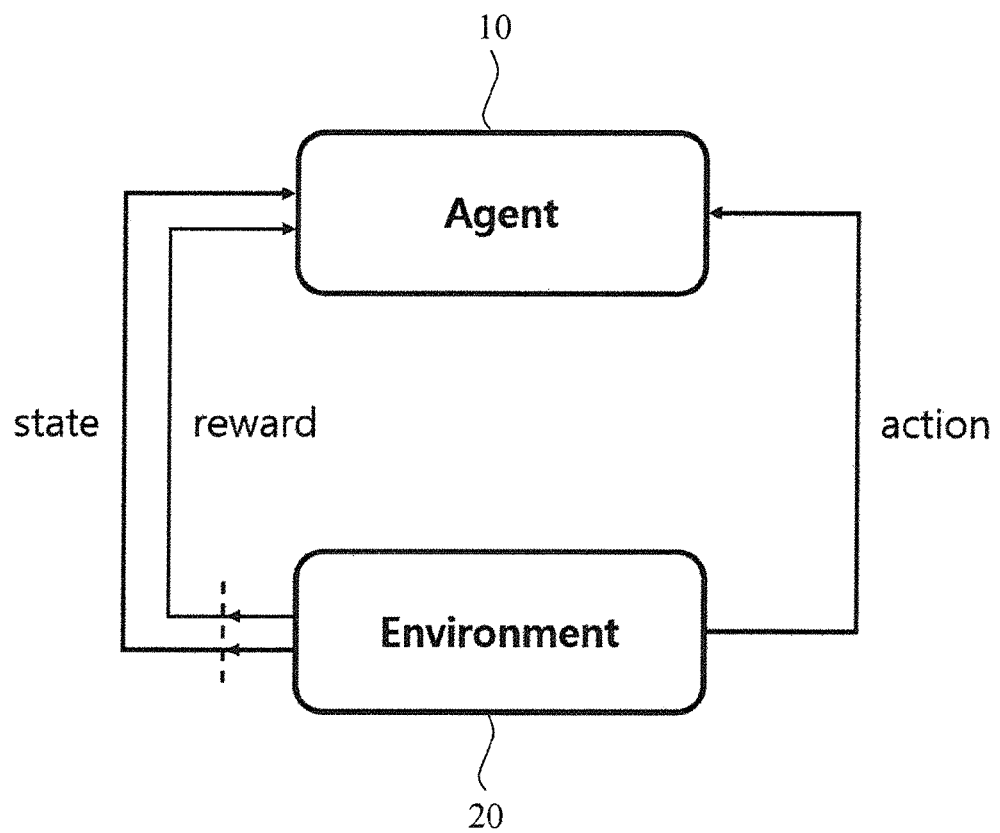
FIG. 2 is a conceptual diagram illustrating a state, an action, and a reward in relation to reinforcement learning according to an embodiment of the invention.

Next, a description is provided of the principles of a state, an action, and a reward in regard to the reinforcement learning according to an embodiment of the invention. Related to this is FIG. 2, which is a conceptual diagram illustrating a state, an action, and a reward in an example of reinforcement learning according to an embodiment of the invention. Reinforcement learning is an area of machine learning and involves an agent 10 defined in a particular environment solving a problem by recognizing a current state and selecting the action that maximizes the reward from among the various actions that can be selected. Here, the reward that the agent 10 may obtain can be positive and negative, and an algorithm may be used to define the series of actions that would maximize the accumulated reward which the agent 10 would obtain. As illustrated in FIG. 2, the agent 10 may select a particular state from among the possible states under the constraints of the environment 20, and based on this, may perform an action. With repetitions of selecting the state and performing the action, the reward may be changed, and the agent 10 may repeat the series of processes until a particular condition is satisfied.

Since a reinforcement learning-based encryption and decryption method performed according to an embodiment of the invention iterates such selecting and performing of states and actions to calculate the reward, it can also be referred to as SARSA (state-action-reward-state-action). That is, an embodiment of the invention provides a problem-solving method using SARSA (state-action-reward-state-action), from among the various types of reinforcement learning.

As described above, the minimum number of key pieces required for obtaining the encryption key may be defined as a threshold value, and this relates to the availability and security of data. Related to this is FIG. 3, which illustrates two graphs having the same N number of key pieces but different threshold values for decrypting the key pieces, in a reinforcement learning-based encryption and decryption method according to an embodiment of the invention. In the case where the threshold is set to 95% compared to the total number of key pieces, the time for retaining the data has not been satisfied, whereas in the case of the 45% threshold percentage, there are pieces of the key that have not been completely deleted after a certain period of time has passed, which can cause security problems. These problems are due to the property of the distributed hash table network that nodes are continuously added/removed.

Figure 3:
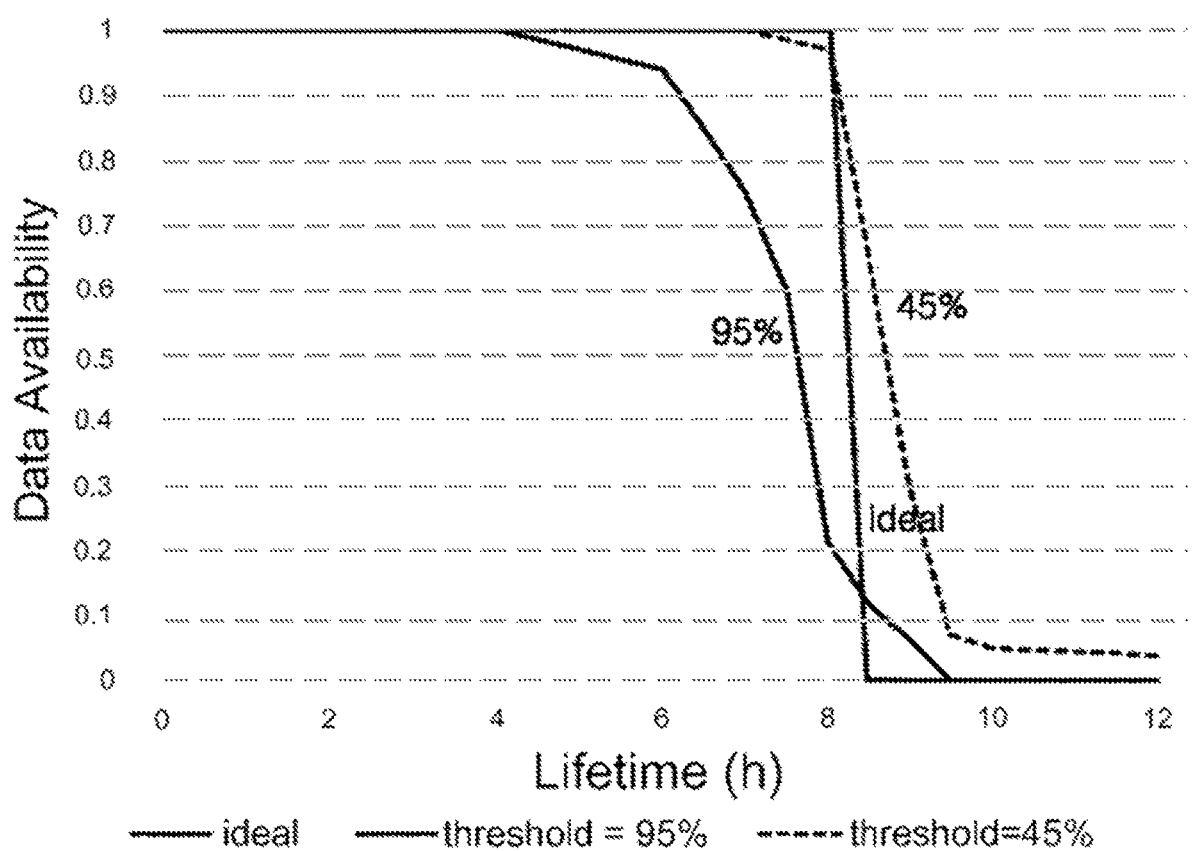
FIG. 3 illustrates two graphs having the same N number of key pieces but different threshold values for decrypting the key pieces, in a reinforcement learning-based encryption and decryption method according to an embodiment of the invention.

To consider both the availability and security of the data in FIG. 3, a threshold value must be found that yields results most similar to the ideal graph. Thus, an embodiment of the invention provides a method of finding the optimal threshold value by applying reinforcement learning based on the similarity levels of the graphs and the threshold values.

Figure 4:
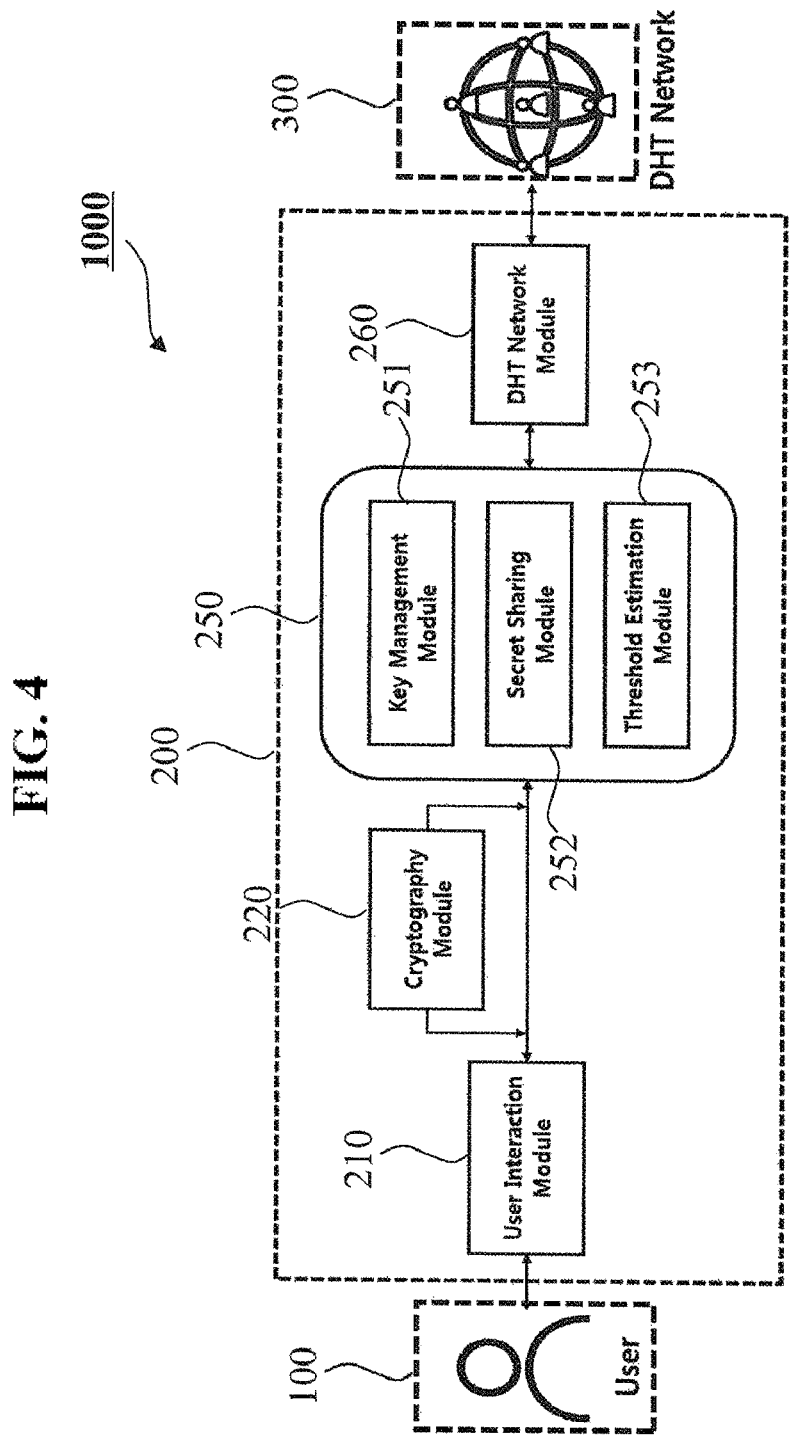
FIG. 4 illustrates the structure of a system performing data encryption and decryption according to an embodiment of the invention.

The structure of a system for performing reinforcement learning-based encryption and decryption in consideration of both data availability and security, according to the concepts described with reference to FIG. 1 to FIG. 3, may be as shown in FIG. 4. That is, FIG. 4 illustrates the structure of a system performing data encryption and decryption according to an embodiment of the invention. An embodiment of the invention presents a technique of determining the threshold value in consideration of the availability and security of data by applying SARSA, a type of reinforcement learning, in a self-destructing environment for privacy protection.

Referring to FIG. 4, a client and server system 1000 that performs encryption and decryption based on reinforcement learning may include a client 100, an encryption/decryption part 200, and a multiple number of clients 300 in a DHT network. Regarding the above, the encryption/decryption part 200 configured to perform reinforcement learning-based encryption and decryption can correspond to a server but is not limited thus, and can take any of a variety of forms according to the application used. For example, certain parts for performing the reinforcement learning-based encryption and decryption can be included in the client 100, which may correspond to a user terminal, while the remaining parts can be implemented by the server. Alternatively, it is possible to have all of the encryption and decryption performed by the client 100 and the receiving client intending to receive the corresponding data (contents), from among the plurality of clients 300.

The encryption/decryption part 200 can include a user interaction (UI) module 210, a cryptography module 220, a security module 250, and a DHT network module 260. The security module 250 may include a key management module 251, a secret sharing module 252, and a threshold estimation module 253.

The UI module 210 may be configured to receive input from the user. The cryptography module 220 may be configured to perform the encryption and decryption on the data. The key management module 251 may be configured to manage the encryption key required for encrypting and decrypting data. Also, the secret sharing module 252 may be configured to perform a secret sharing of the threshold of lifetime and availability for the data. Also, the threshold estimation module 253 may be configured to perform an estimation for such threshold value. The DHT network module 260 may, based on a distributed hash table (DHT), share data with at least one receiving client terminal 300.

The detailed operations of the threshold estimation module 253 mentioned above are as described below. The determining of the threshold value, with the proposed reinforcement learning applied thereto, may be performed at the threshold estimation module 253 through the following procedures. That is, the threshold estimation module 253 can estimate the threshold value by way of parameters that include a state, an action, and a reward, with the threshold value estimated such that the reward is maximized. Table 1 illustrates the parameters for the reinforcement learning and the states, actions, and rewards associated therewith.

TABLE 1

| | |
|---|---|
| State | N, T |
| Action | Select N, T |
| Reward | Similarity with Ideal Graph |

As expressed in Table 1, the states can include a multiple number of different states N, T, according to which the actions can correspond to selecting one of the states N, T. The reward for the state and the selected action can be selected such that a graph representing the lifetime and availability of the data shown in FIG. 3 most closely resembles the ideal form.

The parameters required when estimating the threshold value by applying the SARSA algorithm are state, action, and reward, which can be defined respectively as: a total number of key pieces and a threshold value, an action of selecting a total number of key pieces and a threshold value, and a level of similarity to an ideal data availability graph measured based on the selected total number of key pieces and threshold value. When the learning process begins, the initial state and action may be structuralized into a matrix form, and the matrix may be updated based on the current state and action, the next state and action, and the reward. By this process, the number of total key pieces and the threshold value that maximize the reward can be found, so that in using the self-destructing system, the user may ultimately be permitted to use data only during the desired time, with the data destroyed automatically afterwards.

The operations performed at the threshold estimation module 253 are described below. The threshold estimation module 253 may select the total number of key pieces required for obtaining an encryption key and the threshold value, and can estimate the threshold value such that the reward is maximized, based on the selected total number of key pieces and threshold value. Also, the threshold estimation module 253 can estimate the threshold value such that, in a graph plotting the lifetime and availability of data, a graph is obtained that is the most similar to the most ideal graph in regard to maximizing the reward.

A description of a specific algorithm for thus estimating the threshold value is provided below. Related to this is FIG. 5, which illustrates a specific algorithm for a threshold estimation process to which reinforcement learning is applied according to an embodiment of the invention. In relation to the algorithm represented in FIG. 5, the threshold estimation module 253 may be configured to structuralize the initial state and action in a matrix form and update the matrix based on the current state and action and the next state and action. Also, the threshold estimation module 253 can be configured to estimate the threshold value based on the most recent state, action, and reward if it is decided that the reward is maximum.

More specifically, the threshold estimation module 253 can establish the matrix $Q(s,a)$ according to the initial state and action and can select a first action (a) from a first state (s) by using the matrix $Q(s,a)$. Also, the threshold estimation module 253 can, in each step of an episode, select a first action (a), observe a first reward (r) and a second state (s'), and select a second action (a') from the second state (s'). Regarding this, the first state (s) and first action (a) and the second state (s') and second action (a') can be determined by $Q(s,a) \leftarrow Q(s,a) + \alpha[r + \gamma Q(s',a') - Q(s,a)]$. Here, $\gamma$ is a discount rate indicating the importance of compensation and has a value of 0 to 1. The update of the matrix can be iterated with the second state (s') and the second action (a') substituted by the first state (s) and the first action (a) until the reward corresponding to the substituted first state (s) satisfies a particular condition.

Next, a description is provided of a server that performs reinforcement learning-based encryption and decryption according to another aspect of the present invention. As described above, the encryption/decryption part 200 in FIG. 4 can correspond to a server that performs reinforcement learning-based encryption and decryption according to an embodiment of the invention. The server 200 may include a user interaction (UI) module 210, a cryptography module 220, a security module 250, and a DHT network module 260.

The user interaction (UI) module 210 may be configured to receive input from a transmitting client terminal 100. The cryptography module 220 may be configured to perform encryption and decryption on data. The security module 250 may be configured to manage the encryption key required for the encryption and decryption of the data, perform a secret sharing of the threshold value for the lifetime and availability for the data, and perform an estimation of the threshold value. Also, the DHT network module 260 may be configured to share the data with at least one receiving client terminal 300 based on a distributed hash table (DHT).

Here, the security module 250 can estimate the threshold value by way of parameters including state, action, and reward. Regarding this, the security module 250 can select the threshold value and the total number of key pieces required for obtaining the encryption key and can estimate the threshold value such that the reward is maximized based on the selected number of total key pieces and threshold value. Also, the security module 250 can estimate the threshold value such that the graph plot of the lifetime and availability of the data becomes the most similar to the most ideal graph in terms of maximizing the reward.

More specifically, the security module 250 can structuralize the initial state and action into a matrix form and update the matrix based on the current state and action and the next state and action. Also, if it is decided that the reward is maximized, the security module 250 can estimate the threshold value based on the most recent state, action, and reward.

Specifically, the security module 250 can establish a matrix Q(s,a) according to the initial state and action and can select a first action (a) from a first state (s) by using the matrix Q(s,a). Also, at each step of an episode, the security module 250 can select a first action (a), observe the first reward (r) and a second state (s'), and select a second action (a') from the second state (s'). As already described above, the first state (s) and first action (a) and the second state (s') and second action (a') can be determined from:

$$Q(s,a) \leftarrow Q(s,a) + \alpha[r + \gamma Q(s',a') - Q(s,a)].$$

Regarding this, the matrix update can be iterated with the second state (s') and the second action (a') substituted by the first state (s) and the first action (a) until a reward corresponding to the substituted first state (s) satisfies a particular condition.

Figure 6:
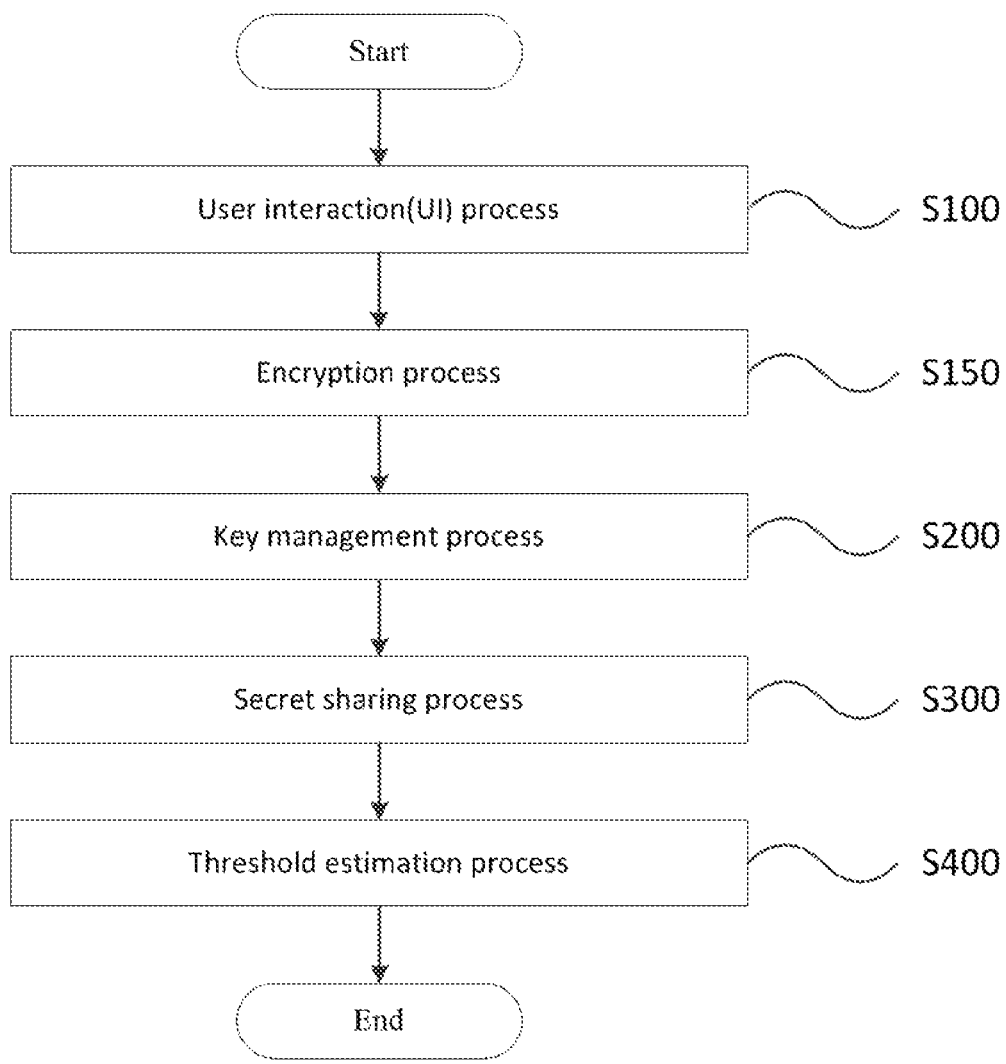
FIG. 6 is a flow diagram of an encryption and decryption method according to an embodiment of the invention.

Below, a description is provided of a reinforcement learning-based encryption and decryption method according to another aspect of the present invention. Related to this is FIG. 6, which is a flow diagram of an encryption and decryption method according to an embodiment of the invention. Although the figure depicts each process as being performed according to sequential order, the order in which the processes are performed can vary and/or one or more processes can be performed simultaneously in a parallel manner according to the application. Referring to FIG. 6, the encryption and decryption method may include a user interaction (UI) process S100, an encryption process S150, a key management process S200, a secret sharing process S300, and a threshold estimation process S400.

In the user interaction (UI) process S100, input may be received from the user. In the encryption process S150, the encryption and decryption of data may be performed. In the key management process S200, the encryption key required for encrypting and decrypting the data may be managed. Also, in the secret sharing process S300, a secret sharing may be performed for the threshold value regarding lifetime and availability for the data. Also, in the threshold estimation process S400, an estimation of the threshold value may be performed.

A more detailed description of the threshold estimation process S400, included in the reinforcement learning-based encryption and decryption method according to an embodiment of the present invention, is provided below. In the threshold estimation process S400, the threshold value can be estimated by way of parameters including state, action, and reward, with the threshold value estimated such that the reward is maximized. Specifically, in the threshold estimation process S400, the threshold value and the total number of key pieces required for obtaining the encryption key may be selected, and the threshold value may be estimated based on the selected total number of key pieces and the threshold value such that the reward is maximized. Also, in the threshold estimation process S400, the threshold value may be estimated such that a graph plotting the lifetime and availability of the data most closely resembles the most ideal form of graph in terms of maximizing the reward.

Figure 7:
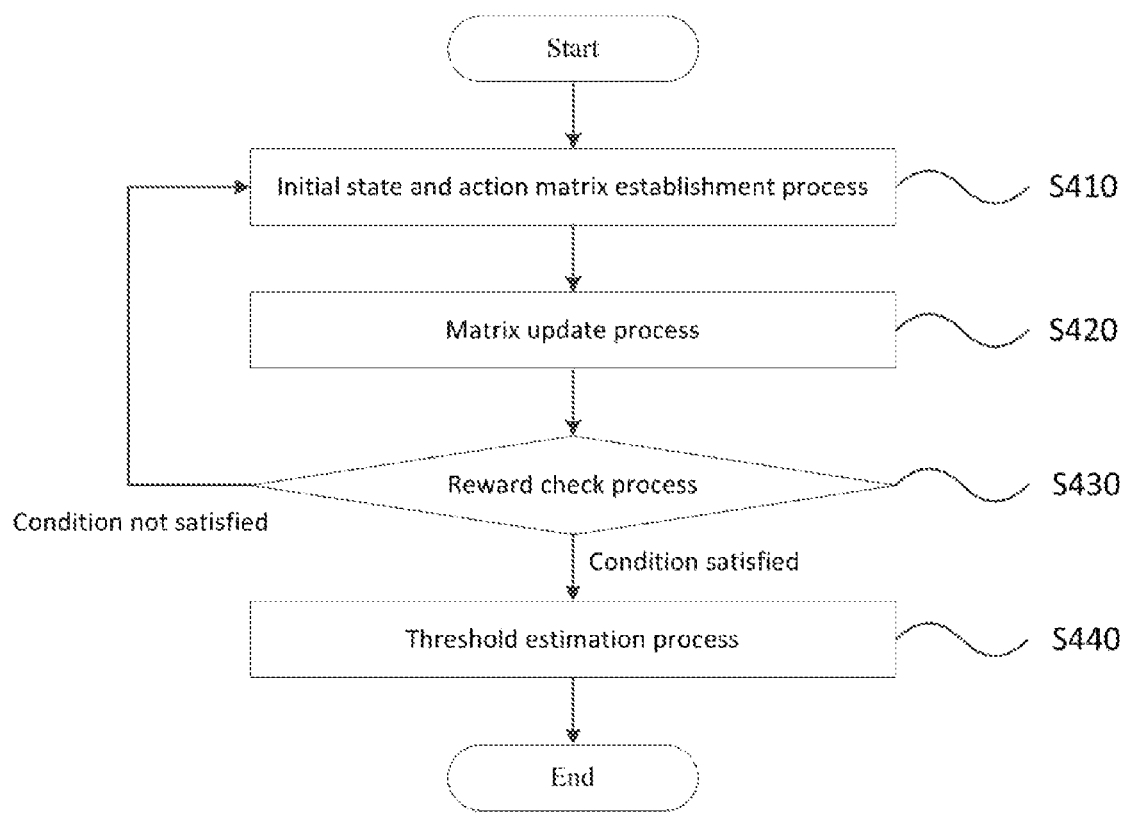
FIG. 7 is a detailed flow diagram of a threshold estimation process according to an embodiment of the invention.

FIG. 7 is a detailed flow diagram of a threshold estimation process according to an embodiment of the invention. Referring to FIG. 7, the threshold estimation process may include an initial state and action matrix establishment process S410, a matrix update process S420, a reward check process S430, and a threshold estimation process S440.

In the initial state and action matrix establishment process S410, the initial state and action may be structuralized into a matrix form. Also, in the matrix update process S420, the matrix may be updated based on the current state and action and the next state and action. In the reward check process S430, it may be decided, based on the most recently updated matrix, whether or not the reward has been maximized. Here, if it is decided that a particular condition has been satisfied and the reward is maximized, then in the threshold estimation process S440, the threshold can be estimated based on the most recent state, action, and reward. On the other hand, if it is decided that a particular condition has not been satisfied and the reward has not been maximized, then the matrix update process S420 can be repeated.

More specifically, in the initial state and action matrix establishment process S410, the matrix Q(s,a) may be established according to the initial state and action. Also, in the matrix update process S420, a first action (a) may be selected from a first state (s) by using the matrix Q(s,a), and at each step of an episode, the first action (a) may e selected, a first reward (r) and a second state (s') may be observed, and a second action (a') may be selected from the second state (s'). Also, in the matrix update process S420, the first state (s) and the first action (a) and the second state (s') and the second action (a') can be determined from Q(s,a)←Q(s,a)+α[r+γQ(s',a')−Q(s,a)]. In the threshold estimation process S400, the matrix update process S420 can be iterated until the reward corresponding to the substituted first state (d) satisfies the particular condition.

The above describes a reinforcement learning-based encryption and decryption method and a client and/or server system that performs the method according to certain embodiments of the present invention. Regarding the above, it is to be appreciated that the features described with reference to the client and server system, the encryption and decryption method, and the server performing the reinforcement learning-based encryption and decryption can be used in various combinations.

The reinforcement learning-based encryption and decryption method and the client and/or server system performing the method described above can be applied as a means of protecting users' personal information stored in a cloud storage. The method and system can also be applied extensively to files, SNS posts, documents, emails, messages, and the like. Furthermore, the method and system can be utilized in cases in which reinforcement learning is applied for estimating a threshold.

The solution presented in an embodiment of the invention can be applied to service provider businesses such as those related to applications, cloud systems, and the like.

A reinforcement learning-based encryption and decryption method according to at least one embodiment of the invention can provide the advantages of improved data availability and security to satisfy user demands in a self-destructing environment for privacy protection.

Also, a reinforcement learning-based encryption and decryption method according to at least one embodiment of the invention can improve data availability and security in a discriminating manner according to the application as well as user demands.

If an embodiment of the invention is implemented by software means, the procedures and functions as well as the components described in the specification can be implemented as separate software modules. Each of the software modules can perform one or more functions and operations of described herein. The software code can be implemented as a software application written in a suitable program language. The software code can be stored in a memory and executed by a controller or processor.

What is claimed is:

1. A client and server system configured to perform a reinforcement learning-based encryption and decryption method, the client and server system comprising:
    a key management module configured to manage an encryption key required in performing an encryption and a decryption of data;
    a secret sharing module configured to perform a secret sharing of a threshold value for a lifetime and availability of the data; and
    a threshold estimation module configured to perform an estimation of the threshold value,
    wherein the threshold estimation module
        estimates the threshold value by using parameters including a state, an action, and a reward such that the reward is maximized,
        structuralizes an initial state and action into a matrix form,
        updates the matrix based on a current state and action and a next state and action, and
        estimates the threshold value based on a most recent state, action, and reward if it is decided that the reward has been maximized.

2. The client and server system of claim 1, further comprising:
    a UI module configured to receive input from a user; and
    a cryptography module configured to perform the encryption and decryption of the data.

3. The client and server system of claim 1, wherein the threshold estimation module selects the threshold value and a total number of key pieces required for obtaining the encryption key, estimates the threshold value such that the reward is maximized based on the selected total number of key pieces and threshold value, and estimates the threshold value such that, with respect to a graph plotting the lifetime and availability of the data, a graph is obtained most closely resembling an ideal graph in relation to maximizing the reward.

4. The client and server system of claim 1, wherein the threshold estimation value establishes a matrix Q(s,a) according to the initial state and action, selects a first action (a) from a first state (s) by using the matrix Q(s,a), and at each step of an episode, selects the first action (a), observes a first reward (r) and a second state (s'), and selects a second action (a') from the second state (s').

5. The client and server system of claim 4, wherein the first state (s) and first action (a) and the second state (s') and second action (a') are determined from:

$$Q_{(s,a)} \leftarrow Q_{(s,a)} + \alpha[r + \gamma Q(s',a') - Q(s,a)],$$

and an updating of the matrix is iterated with the second state (s') and the second action (a') substituted by the first state (s) and the first action (a) until a reward corresponding to the substituted first state (s) satisfies a particular condition.

6. An encryption and decryption method based on reinforcement learning, the method comprising:
    a key management process for managing an encryption key required in performing an encryption and a decryption of data;
    a secret sharing process for performing a secret sharing of a threshold value for a lifetime and availability of the data; and
    a threshold estimation process for performing an estimation of the threshold value,
    wherein the threshold estimation process comprises:
        estimating the threshold value by using parameters including a state, an action, and a reward such that the reward is maximized;
        structuralizing an initial state and action into a matrix form;
        updating the matrix based on a current state and action and a next state and action; and
        estimating the threshold value based on a most recent state, action, and reward, if it is decided that the reward has been maximized.

7. The encryption and decryption method of claim 6, further comprising, before the key management process:
    a user interaction (UI) process for receiving input from a user; and
    an encryption process for performing the encryption and decryption of the data.

8. The encryption and decryption method of claim 6, wherein the threshold estimation process further comprises selecting the threshold value and a total number of key pieces required for obtaining the encryption key, estimating the threshold value such that the reward is maximized based on the selected total number of key pieces and threshold value, and estimating the threshold value such that, with respect to a graph plotting the lifetime and availability of the data, a graph is obtained most closely resembling an ideal graph in relation to maximizing the reward.

9. The encryption and decryption method of claim 6, wherein the structuralizing of the initial state and action into a matrix form comprises:
    establishing a matrix Q(s,a) according to the initial state and action,
    and the updating of the matrix comprises:
    selecting a first action (a) from a first state (s) by using the matrix Q(s,a); and
    selecting the first action (a), observing a first reward (r) and a second state (s'), and selecting a second action (a') from the second state (s') at each step of an episode.

10. The encryption and decryption method of claim 9, wherein the updating of the matrix comprises determining the first state (s) and first action (a) and the second state (s') and second action (a') from:

$$Q(s,a) \leftarrow Q(s,a) + \alpha[r + \gamma Q(s',a') - Q(s,a)],$$

and the updating of the matrix is iterated with the second state (s') and the second action (a') substituted by the first state (s) and the first action (a) until a reward corresponding to the substituted first state (s) satisfies a particular condition.

11. A server configured to perform a reinforcement learning-based encryption and decryption method, the server comprising:
    a user interaction (UI) module configured to receive input from a transmitting client terminal;
    a cryptography module configured to perform encryption and decryption of data;
    a security module configured to manage an encryption key required in performing the encryption and decryption of the data, perform a secret sharing of a threshold value for a lifetime and availability of the data, and perform an estimation of the threshold value; and
    a DHT network module configured to share the data with at least one receiving client terminal based on a distributed hash table (DHT),
    wherein the security module
        estimates the threshold value by using parameters including a state, an action, and a reward such that the reward is maximized,
        structuralizes an initial state and action into a matrix form,
        updates the matrix based on a current state and action and a next state and action, and
        estimates the threshold value based on a most recent state, action, and reward if it is decided that the reward has been maximized.

12. The server of claim 11, wherein the security module selects the threshold value and a total number of key pieces required for obtaining the encryption key, estimates the threshold value such that the reward is maximized based on the selected total number of key pieces and threshold value, and estimates the threshold value such that, with respect to a graph plotting the lifetime and availability of the data, a graph is obtained most closely resembling an ideal graph in relation to maximizing the reward.

13. The server of claim 11, wherein the security module establishes a matrix Q(s,a) according to the initial state and action, selects a first action (a) from a first state (s) by using the matrix Q(s,a), and at each step of an episode, selects the first action (a), observes a first reward (r) and a second state (s'), and selects a second action (a') from the second state (s').

14. The server of claim 13, wherein the first state (s) and first action (a) and the second state (s') and second action (a') are determined from:

$$Q(s,a) \leftarrow Q(s,a) + \alpha[r + \gamma Q(s',a') - Q(s,a)],$$

and an updating of the matrix is iterated with the second state (s') and the second action (a') substituted by the first state (s) and the first action (a) until a reward corresponding to the substituted first state (s) satisfies a particular condition.

* * * * *